April 11, 1961     A. S. LOUIS     2,979,682
MULTI-ELEMENT PRECISION POTENTIOMETER
Filed March 8, 1960     2 Sheets-Sheet 1
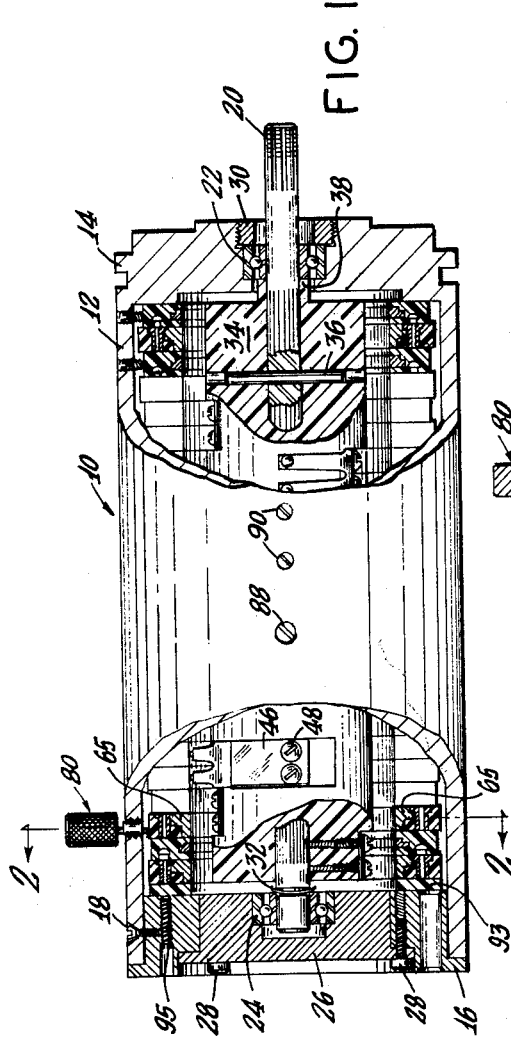
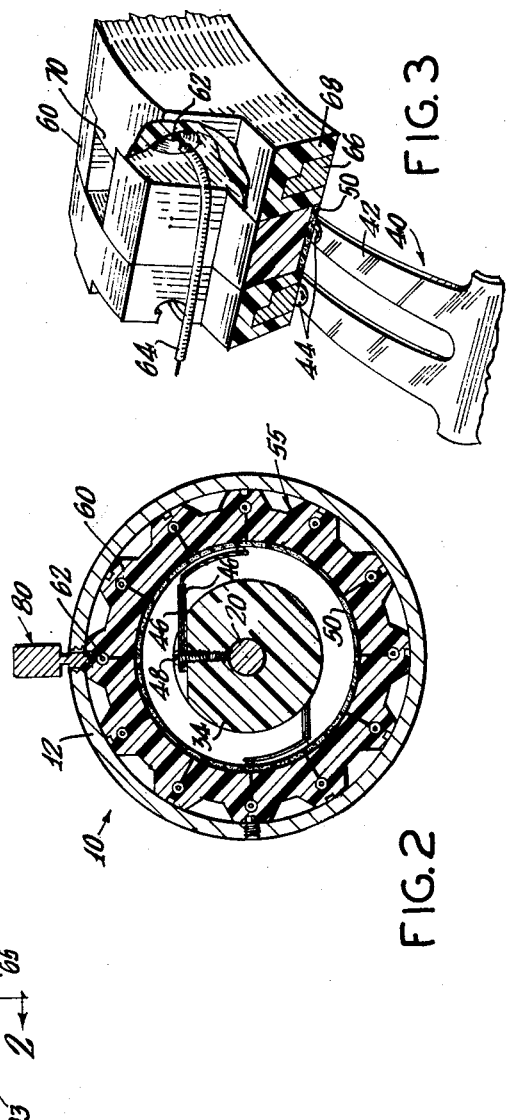
INVENTOR.
ARNOLD S. LOUIS
BY
Leonard H. King April 11, 1961 A. S. LOUIS 2,979,682
MULTI-ELEMENT PRECISION POTENTIOMETER
Filed March 8, 1960 2 Sheets-Sheet 2
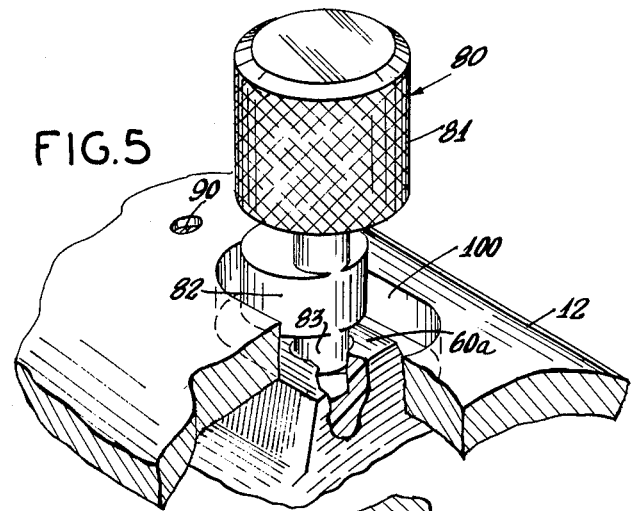
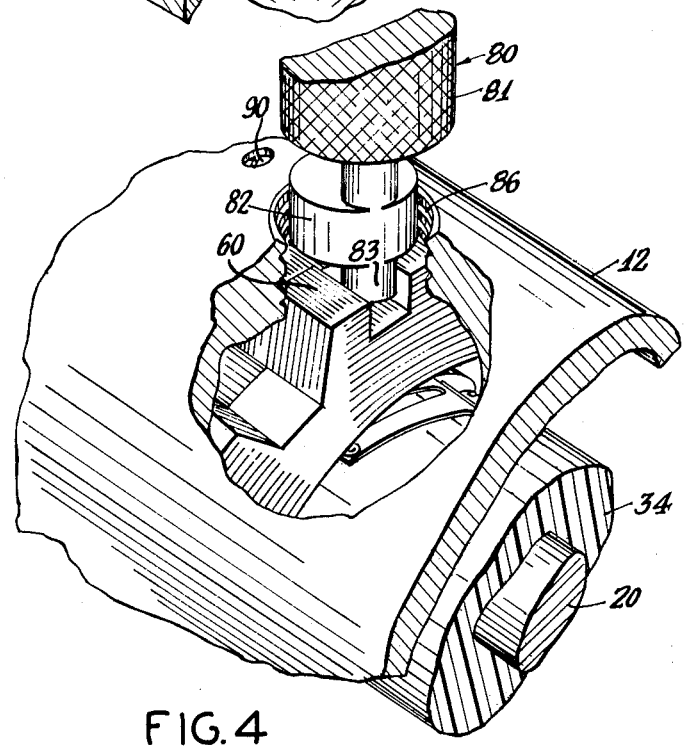
INVENTOR.
ARNOLD S. LOUIS
BY
Leonard H. King United States Patent Office 2,979,682
Patented Apr. 11, 1961

2,979,682

MULTI-ELEMENT PRECISION POTENTIOMETER

Arnold S. Louis, Hastings on Hudson, N.Y., assignor to Myron A. Coler, Scarsdale, N.Y.

Filed Mar. 8, 1960, Ser. No. 13,624

10 Claims. (Cl. 338—143)

This invention relates to multi-element potentiometers employing a common rotatable actuating shaft, and, in particular, to means for phasing individual units to provide a desired electrical relationship for each element relative to the corresponding angular position of the common actuating shaft. The term "potentiometer," as used hereinafter, will be understood as pertaining to variable resistance devices in general.

Many electro-mechanical devices such as computers, navigational aids, radar sets, and other like devices, require the translation of the angular position of a rotating shaft into a plurality of electrical signals. Conventionally this is accomplished through the use of a multiplicity of individual potentiometer cups coupled together and varied simultaneously by a common control shaft. The term "cup" is employed with reference to a modular potentiometer section which includes a resistance element, take-off means, wipers, and a set of terminals.

Multitap potentiometers have many uses in a variety of electronic systems. Among their important applications is that of generating functions by means of voltage and/or resistance padding. In certain computers it is desirable to convert a single shaft input motion to a number of different functional output signals. This can be accomplished by ganging a large number of linear multi-tap potentiometers into a single construction wherein each potentiometer cup resistance element is contacted by one or more wipers actuated by the common shaft.

In ganging a large number of potentiometer cups, maintaining the concentricity of the resistive elements relative to the shaft becomes a problem as the element distance from the shaft ball-bearings increases. In turn, any lack of concentricity contributes to function conformity output errors. One solution to the concentricity problem, disclosed hereinafter, is to house the several potentiometer elements in a monolithic case in which the concentricity of the case I.D. to the shaft bearing is closely held. In such a design, the concentricity of the resistive track to the input shaft is dependent on the fit between the element O.D. and the case I.D., the concentricity of the element track to the element O.D., and the concentricity of the case I.D. to the shaft bearing. The use of a properly designed monolithic structure prevents the successive build-up of eccentricities which may be encountered when a large number of modular potentiometer cups are located, with respect to one another, by means of pilot diameters and held together by means of clamp rings or screws. The very nature of the monolithic structure assures that the center resistance element, in a multi-element structure, can have as close a concentricity as those decks nearest the shaft bearings.

A potentiometer containing a substantial number of elements, wherein each element has many taps, requires a large number of leads if all the tap points on all the elements are to be utilized. Furthermore, it may be necessary that these leads, when the potentiometer is to be employed for arbitrary function generation, be fed into a network providing resistance and/or voltage padding. A passageway for all these leads to exit from the potentiometer is provided by forming channels between the potentiometer case and element. This is done by fabricating the resistive and take-off elements into a cog-shaped assembly, the space between the teeth of the cog acting as lead channels. The leads are thus led from each element and its accompanying take-off member into a channel and out of the rear of the potentiometer where they terminate in connector plugs. Such an arrangement is preferable to the "porcupine" effect resulting from radial terminals issuing from a series of modular units.

The use of plug connections is particularly advantageous since it makes practical the use of modular units incorporating electronic circuitry to be employed in combination with the potentiometers.

It is to be appreciated that in the present state of the art, precision potentiometers are employed which have an accuracy of better than 1%, and indeed, often a linearity of 0.5% or even 0.1%.

In order to take full advantage of the basic accuracy of the units it is necessary to accurately phase the individual cup elements with respect to the common shaft. Approximate phasing can readily be accomplished in the course of assembly. However, it is essential that means be provided to precisely adjust the phasing after the entire assembly is completed. The device of this invention includes means for accurately performing the fine phasing operation.

Briefly stated, this invention relates to a novel monolithic potentiometer structure having a plurality of individual potentiometer resistance elements and a common actuating shaft for simultaneously moving wipers associated with each of the resistance elements. Means are also disclosed for varying the relative mechanical position of each of the resistance elements relative to its associated wiper so as to accurately vary the phase relationship between individual resistance elements.

Accordingly, it is an object of this invention to provide a compact multi-element potentiometer controlled by a common actuating shaft.

It is an object of the present invention to provide an improved arrangement for adjusting the relative phase of a plurality of potentiometers controlled by a common shaft.

Still another object of the present invention is to provide an improved clamping means for retaining together, in ganged relationship, a plurality of potentiometer elements.

Still another object of this invention is to provide a multi-element potentiometer having means for adjusting the relative phase angle between elements and which means is characterized by mechanical simplicity.

A still different object of this invention is to provide a multi-element potentiometer having means for accurately adjusting the phase relationship between elements.

Another object of this invention is to provide a compact monolithic multi-element potentiometer structure.

A different object of this invention is to provide a multi-wiper potentiometer employing a common actuating shaft wherein the wipers are located in accordance with an improved distribution pattern.

Still further and other objects of the present invention subsequently will become apparent by reference to the following description, taken in conjunction with the accompanying drawings, wherein:

Figure 1 is a side elevational view, partially broken away, of a multi-element potentiometer of this invention.

Figure 2 is a cross sectional view of the potentiometer of Figure 1 as seen in the direction of the arrows along the line 2—2.

Figure 3 is a perspective showing of a typical portion of the resistance element and take-off member in cooperation with a wiper member.

Figure 4 shows pictorially the potentiometer of Figures 1–3 in conjunction with a phase adjusting tool.

Figure 5 shows pictorially an alternate embodiment of the invention with an adjusting tool inserted in position for making a fine phasing adjustment.

Referring now to the drawings, there is shown a potentiometer structure of this invention indicated generally by the reference numeral 10. The potentiometer case 12 is machined from a solid block of aluminum. Aluminum is a preferred material for this purpose because of its light weight and structural stability. One end of the case is provided with a conventional servo type mounting 14. The other end of the case is closed by an aluminum end cap 16, which is attached to the case by a multiplicity of conventional flat head screws 18. One of the screws 18 is visible in the showing of Figure 1. A stainless steel actuating shaft 20 is supported between bearings 22 and 24; bearing 24 is supported in a bearing plate 26, which is attached to end plate 16 by means of screws 28. Three such screws 28 are employed at 120° intervals. To protect against dirt and dust bearings 22 and 24 are preferably of the shielded type. A tubular screw 30 acting against the front end bearing 22 provides means to take up axial play. Spring washer 32, seated in an annular groove in shaft 20, acts against rear bearing 24. An insulator plastic, in this case a molded phenolic, forms rotor member 34. The rotor member 34 is secured to shaft 20 by means of pin 36 press-fit into a continuous bore formed in shaft 20 and rotor 34. Shoulder 38 of rotor 34 seats against bearing 22. Thus, as screw 30 is tightened against bearing 22, the bearing in turn acts against shoulder 38 moving the shaft so as to tension the spring washer 32 against bearing 26.

Referring now to the section of Figure 2, it will be noted that there is affixed to rotor 34 a number of wiper assemblies 40. Each wiper assembly includes a bifurcated beryllium copper spring member 42 to which is attached a precious metal wiper 44. Each of the wiper assemblies 40 are secured, to flats formed on the rotor, by means of a pair of beryllium copper supporting plates 46 and screws 48. It will be noted that the wiper assemblies 40 are deployed in sets oriented 90° apart from each other. Surprisingly, it was found that for a 12 element potentiometer employing 12 brush assemblies, it was undesirable to dispose the brush assemblies spirally about the periphery of the rotor as this resulted in a strong twisting torque being exerted on the shaft, which in turn subjected the ball bearings to a high radial load. As a consequence a high torque was required to rotate the shaft. The arrangement shown wherein the brushes are spaced in sets 90° apart was found to be preferable, as this brush arrangement precludes any significant twisting torque being transmitted to the shaft.

More specifically, the arrangement of the brushes to prevent torque on shaft is as follows: Adjacent pairs of springs are located about 180° apart, successive pairs are about 90° apart. Thus, if the location of the first spring is regarded as being at 0°, the next spring would be at 180°, the third at 90°, and the fourth at 270°. The pattern then repeats. The essential condition is the 180° angle between successive spring locations. It is not essential that the pairs of springs be precisely 90° apart.

Another important feature of the disclosed device is that the brushes are carried by spring members which form an arc substantially concentric to the tracked circle of resistance element 50. The brushes are further supported by a set of plates 46 and are attached to the rotor by a pair of screws 48.

The significance of the employment of a pair of fastening means 48 is that it prevents any movement of the wiper assembly in a transverse direction as may occur when but a single fastening means is used.

Each of the potentiometer elements 55 consists of a pair of concentric rings. The outer ring is formed of a molded insulator phenolic member 60, joined to a thin inner ring 50 of a phenolic having distributed conductive carbon to render it electrically conductive. The resistance element 50 is normally interrupted at one point and the gap filled in with insulator plastic to provide a smooth contact surface for the wiper.

It will be noted that the insulator ring 60 is provided with a plurality of terminals 62, each of which are in contact with a thin metal member extending radially through the ring 60 making contact with the resistance element 50. One method of providing this construction is disclosed in the copending application of Arnold S. Louis, Serial No. 832,329, filed August 7, 1959, for Multitap Electrical Element and Method of Making Same, and assigned to the assignee of the present application. Leads 64 from terminals 62 are fed through the valleys of the cog-shaped member 60 to an opening in the rear cover 16 and provides means to connect the potentiometer element to external circuits. A metal ring 66 serves as the potentiometer takeoff. Ring 66 is supported in an insulator phenolic ring 68. Ring 68 is provided with a key 70 which engages a mating notch in ring 60. The takeoff member assembly is readily formed by the insert molding of the metal ring in the plastic supporting member. As an alternative, the ring 66 may be formed of high conductivity electrically conductive plastic.

Two different embodiments of the phasing means are shown in Figures 4 and 5. Both employ a tool 80 comprising a knob portion 81, cam portion 82 and shaft portion 83.

Considering first the embodiment of Figure 4, the tool is inserted into a selected one of the threaded bores 86 helically disposed about the periphery of the case 12. The cam portion seats in threaded bore 86. The peaks of the threads are cut away to provide a flat bearing surface which will not damage the cam portion. The shaft 83 seats in a slot in member 60. After assembly the final fine adjustment is made by connecting the input terminals of the resistance element to a source of electrical potential and observing the deflection of a meter connected to the output terminals while knob 81 is rotated until the desired deflection is obtained for a predetermined position of shaft 20. After adjustment has been completed the element is permanently locked in place against movement by means of a headless set screw 90.

In the alternative phasing arrangement, a slot 100 is provided in case 12 and a round hole for the receipt of shaft 83 is provided in element 60a. As knob 81 is rotated cam 82 traverses slot 100 in an oscillatory motion while element 60a rotates circumferentially with respect to the shaft 20. A set screw 90 is provided for locking the element permanently in place.

The slot may be sealed by the use of potting compound. It will be appreciated that the phasing means of Figure 4 is an improvement, over the embodiment of Figure 5, from the viewpoint of simplicity and lower manufacturing cost. More importantly, the closing of the phasing holes may be conveniently and more effectively made by the use of a simple screw 88.

The phasing tool may be inserted at a future time, should the need arise for a readjustment, by simply removing the closure screw 88. On the other hand the embodiment of Figure 5 requires the removal and replacement of potting compound.

An insulator plastic disc 93 is employed to isolate the end element from end member 16. Three equally spaced headless set screws 95 (one of which is visible in Figure 1) serves as a means to clamp disc 93 and the plurality of members 60 and 68 against axial movement.

What is claimed is:

1. In a potentiometer, the combination comprising: a central shaft rotatable about a longitudinal axis; an annular resistance element mounted concentric about said axis; a resilient wiper arm mounted on said central shaft for forced rotation about said longitudinal axis in the plane of said resistance element, in cooperation with said shaft upon rotation thereof; said wiper arm including a straight first portion extending in a direction parallel to a line normal to the axis and a radially flexed second portion concentric to said resistance element; a pair of rigid supporting plates positioned on either side of said resilient member first portion and substantially co-extensive therewith; and wiper means mounted on said wiper arm and radially outwardly biased into frictional engagement with said resistance element.

2. In a multi-element potentiometer, the combination comprising: a central shaft rotatable about a longitudinal axis; a plurality of resistance elements mounted in axially spaced relation along said axis and concentric thereto; a plurality of wiper arms mounted on said central shaft for forced rotation about said longitudinal axis in cooperation with said shaft upon rotation thereof; one of said wiper arms being positioned in the plane of each of said annular resistance elements, pairs of said arms being arranged in sets, each of said sets being displaced approximately 90° from an adjacent set of arms, each of said arms of a set being displaced approximately 180° from each other.

3. The combination of claim 2, wherein said central shaft comprises an axial metal shaft and a coaxial electrically non-conductive sleeve secured to said metal shaft so as to rotate in unison therewith, wherein said resilient member first portions are mounted on said sleeve and are electrically isolated from said metal shaft.

4. In a potentiometer, comprising in combination: a central shaft rotatable about a longitudinal axis; a housing, including a one-piece tubular shell portion provided with openings adapted to receive a phasing tool, said housing being mounted concentric about said axis, a first radially located end closure and a second radially located end closure affixed to opposite ends of said tubular shell portion; a plurality of pairs of annular members, each of said members including an axial cylindrical inner face and a corrugated cylindrical outer face, provided with a recess adapted to receive a phasing tool member, said cylindrical faces being intersected by a pair of parallel spaced flat radial faces, the said inner cylindrical face of one of said members including an annular electrically conductive take-off member concentric to said shaft, the said inner cylindrical face of the other of said members of a pair including an annular resistance element, a plurality of pairs of electrically connected resilient wiper arms mounted on said central shaft for forced rotation about said longitudinal axis in cooperation with said shaft upon rotation thereof; wiper means mounted on each of said wiper arms and radially outwardly biased so that one wiper is in frictional engagement with a take-off member and one wiper is in frictional engagement with a said resistance member; conductive leads located between the corrugations of said annular members, one end of selected one of said leads being connected to said resistance elements and said take-off members, the other end of said leads passing through openings in the second end closure for connecting said resistance elements and said take-off members to external circuits; a pressure plate interposed between said second end closure and an end one of said annular members; screws extending through said second end closure for tightening said pressure plate against said end annular member, and releasable means for securing said resistance element annular members for preventing rotation about said axis.

5. The potentiometer of claim 4, wherein said tubular shell phasing tool receiving openings are elongated slots and said annular member recess is in the form of a tubular bore and, in combination therewith, a phasing tool having a knob portion, a first shaft portion adapted to rotate in the tubular shell tool receiving openings and a second shaft portion adapted to mate with the tubular bore in the annular member wherein said first and said second shaft portions are on spaced parallel axes.

6. The potentiometer of claim 4, wherein said tubular member phasing tool receiving openings are threaded bores provided with a flat crown and said annular member recess is in the form of a slot and, in combination therewith, a phasing tool having a knob portion, a first shaft portion adapted to rotate in the tubular shell openings and a second shaft portion adapted to mate with the slot in the annular member wherein said first and said second shaft portions are on spaced parallel axes.

7. The potentiometer of claim 4, wherein said tubular member phasing tool receiving openings are threaded bores and said annular member recess is in the form of a slot and, in combination therewith, a phasing tool having a knob portion, a first shaft portion adapted to rotate in the tubular shell openings and a second shaft portion adapted to mate with the slot in the annular member wherein said first and said second shaft portions are on spaced parallel axes.

8. A potentiometer including a tubular shell provided with a phasing tool receiving elongated slot; a resistance member carried by a rotatable annular member provided with a tubular bore adapted to receive a phasing tool member; electrically conductive wiper means arranged to traverse said resistance member; and means for electrically connecting said wiper means and said resistance element to external circuits and, in combination therewith, a phasing tool having a knob portion, a first shaft portion adapted to rotate in the tubular shell tool receiving elongated slot and a second shaft portion adapted to mate with the tubular bore in the annular member wherein said first and said second shaft portions are on spaced parallel axes.

9. A potentiometer including a tubular shell provided with a phasing tool receiving threaded bore provided with a flat crown; a resistance member carried by a rotatable annular member provided with a slot adapted to receive a phasing tool member; electrically conductive wiper means arranged to traverse said resistance member; and means for electrically connecting said wiper means and said resistance element to external circuits and, in combination therewith, a phasing tool having a knob portion, a first shaft portion adapted to rotate in the tubular shell threaded bore and a second shaft portion adapted to mate with the slot in the annular member wherein said first and said second shaft portions are on spaced parallel axes.

10. A potentiometer including a tubular shell provided with a phasing tool receiving threaded bore; a resistance member carried by a rotatable annular member provided with a slot adapted to receive a phasing tool member; electrically conductive wiper means arranged to traverse said resistance member; and means for electrically connecting said wiper means and said resistance element to external circuits and, in combination therewith, a phasing tool having a knob portion, a first shaft portion adapted to rotate in the tubular shell threaded bore and a second shaft portion adapted to mate with the slot in the annular member wherein said first and said second shaft portions are on spaced parallel axes.

References Cited in the file of this patent

UNITED STATES PATENTS

| | | |
|---|---|---|
| 2,461,843 | Opocensky | Feb. 15, 1949 |
| 2,480,995 | Armitage | Sept. 6, 1949 |
| 2,738,405 | Jorgensen et al. | Mar. 13, 1956 |
| 2,778,907 | Hamren | Jan. 22, 1957 |